United States Patent
Domeki et al.

(10) Patent No.: US 7,425,785 B2
(45) Date of Patent: Sep. 16, 2008

(54) PERMANENT MAGNET MOTOR

(75) Inventors: Hideo Domeki, Kashiwa (JP);
Yoshiyasu Yamanaka, Kashiwa (JP)

(73) Assignee: Oriental Motor Co., Ltd., Tokyo (JP)

( * ) Notice: Subject to any disclaimer, the term of this patent is extended or adjusted under 35 U.S.C. 154(b) by 531 days.

(21) Appl. No.: 11/133,644

(22) Filed: May 20, 2005

(65) Prior Publication Data

US 2005/0264122 A1    Dec. 1, 2005

(30) Foreign Application Priority Data

May 26, 2004    (JP) ............................. 2004-155760

(51) Int. Cl.
*H02K 1/27* (2006.01)
(52) U.S. Cl. ..................... 310/156.45; 310/156.38; 310/156.46
(58) Field of Classification Search ............ 310/156.01, 310/156.45, 156.38, 51
See application file for complete search history.

(56) References Cited

U.S. PATENT DOCUMENTS

| | | | |
|---|---|---|---|
| 6,707,209 B2 * | 3/2004 | Crapo et al. ........... | 310/156.43 |
| 2002/0067092 A1 * | 6/2002 | Crapo et al. ........... | 310/156.47 |
| 2002/0185929 A1 * | 12/2002 | Jang et al. .................. | 310/210 |

FOREIGN PATENT DOCUMENTS

| JP | 02111238 A | * | 4/1990 |
|---|---|---|---|
| JP | 02142333 A | * | 5/1990 |
| JP | 03117338 A | * | 5/1991 |
| JP | 2000-350393 | | 12/2000 |
| JP | 2002084695 A | * | 3/2002 |
| JP | 2003230239 A | * | 8/2003 |
| JP | 2003230240 A | * | 8/2003 |

* cited by examiner

*Primary Examiner*—Burton Mullins
(74) *Attorney, Agent, or Firm*—Trop, Pruner & Hu, P.C.

(57) ABSTRACT

In a permanent magnet motor consisting of a rotor 1, which is supported on a rotating shaft 2 and has twelve permanent magnets 3 arranged at fixed intervals in the circumferential direction in the peripheral edge portion thereof, and a stator 4, which is disposed around the rotor 1 with a gap being provided with respect to the rotor 1 and has nine magnetic poles 4a, each having a coil wound thereon, arranged at fixed intervals in the circumferential direction so as to face towards the outer peripheral surface of the rotor 1,
  a value obtained by dividing the radius of the rotor 1 by the radius of curvature of a permanent magnet surface facing towards the stator is set at a value such as to decrease cogging torque.

Thereby, there is provided a permanent magnet motor in which the radius of an arcuate shape which can minimize cogging torque is theoretically verified, by which the optimum radius can be determined limitedly for a permanent magnet motor consisting of a rotor having twelve permanent magnets and a stator having nine magnetic poles.

2 Claims, 5 Drawing Sheets

$\alpha = 2$         $\alpha = 3.6$

PERMANENT MAGNET MOTOR

BACKGROUND OF THE INVENTION AND RELATED ART STATEMENT

The present invention relates to a permanent magnet motor and, more particularly, to a permanent magnet motor consisting of a rotor having twelve permanent magnets and a stator having nine magnetic poles.

Generally, permanent magnet motors have been used widely as control motors including servomotors because of their high efficiency and controllability.

FIG. 8 shows a conventional permanent magnet motor. This permanent magnet motor includes a rotor 12, which is formed by affixing C-shaped permanent magnets 10 in the radial direction onto the surface of a rotor yoke 11, and a stator consisting of a stator yoke 13 having a plurality of slots 15 arranged via a gap and a coil 17 wound on teeth 14. For this permanent magnet motor, the number of poles of the permanent magnet 10 is six, and the number of teeth is eighteen.

The torque of an AC servomotor etc. requiring highly accurate torque control must have small pulsation. Fluctuations in running torque caused by a change in magnetic flux distribution in a gap made by the positional relationship between the slot of stator and the permanent magnet at the time when the permanent magnet 10 is rotated, what is called cogging torque (torque in a state in which no current is caused to flow in the coil), occur, which exerts an adverse influence on uneven rotation and positioning accuracy.

To reduce this cogging torque, a method is used in which a C-shaped or D-shaped permanent magnet 20 whose center of outside diameter is shifted so that the end shape of the permanent magnet becomes thin.

In this method, there is proposed a technique in which the center of the arcuate shape of a rotor magnet portion facing towards the stator is shifted from the rotation center of the rotor, and the radius of the arcuate shape thereof is different from the radius of rotor. In FIG. 9, reference character 21 denotes the rotor yoke, R12 denotes the radius of curvature of the permanent magnet 20, R13 denotes the radius of the rotor yoke 21, and R15 denotes the radius of the rotor.

By using this method, the magnetic flux distribution in the permanent magnet end portion, which is a magnetic pole changeover portion in which a change in magnetic flux distribution is large, is made smooth, and hence the cogging torque can be reduced (refer to Japanese Patent Provisional Publication No. 2000-350393 as Patent Document 1).

However, for the above-described conventional permanent magnet motor, the optimal radius of the arcuate shape has conventionally been determined empirically or on a trial-and-error basis. Therefore, a study must be conducted for each motor.

OBJECT AND SUMMARY OF THE INVENTION

The present invention has been made to solve the above problems, and accordingly an object thereof is to provide a permanent magnet motor in which the radius of an arcuate shape which can minimize cogging torque is theoretically verified, whereby the optimum radius can be determined limitedly for a permanent magnet motor consisting of a rotor having twelve permanent magnets and a stator having nine magnetic poles.

To solve the above problems, the present invention provides a permanent magnet motor consisting of a rotor, which is supported on a rotating shaft and has twelve permanent magnets arranged at fixed intervals in the circumferential direction in the peripheral edge portion thereof, and a stator, which is disposed around the rotor with a gap being provided with respect to the rotor and has nine magnetic poles, each having a coil wound thereon, arranged at fixed intervals in the circumferential direction so as to face to the outer peripheral surface of the rotor, wherein a value obtained by dividing the radius of the rotor by the radius of curvature of a permanent magnet surface facing towards the stator is set at a value such as to decrease cogging torque.

Also, the value obtained by dividing the radius of rotor by the radius of curvature of a permanent magnet surface facing towards a stator is set in the range of 2.55 to 2.7.

Further, the value obtained by dividing the radius of rotor by the radius of curvature of a permanent magnet surface facing towards a stator is set at 2.6.

According to the present invention, cogging torque can be decreased.

DETAILED DESCRIPTION OF PREFERRED EMBODIMENTS

An embodiment of the present invention will now be described in detail with reference to the accompanying drawings.

Figure 1:
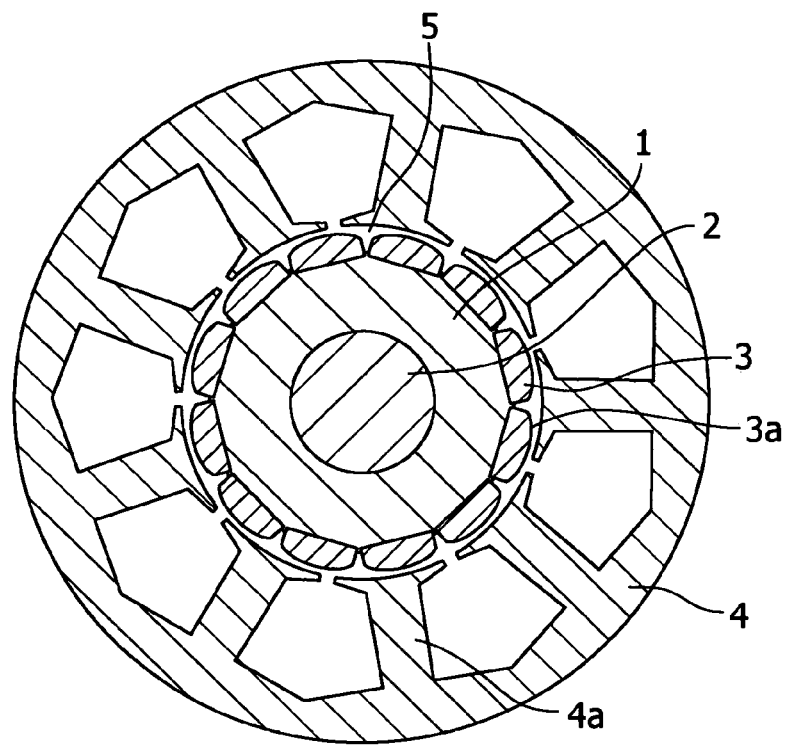
FIG. 1 is a schematic view showing a permanent magnet motor in accordance with one embodiment of the present invention.
Figure 2:
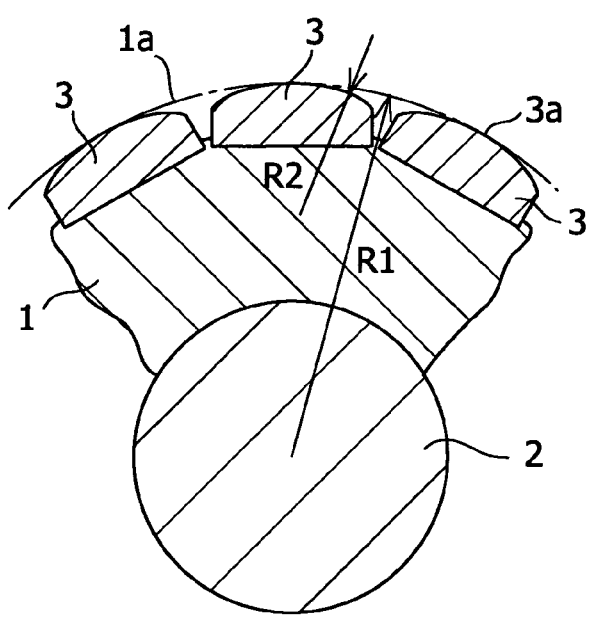
FIG. 2 is a schematic view showing the radius of the outer peripheral surface of a rotor and the radius of curvature of a permanent magnet portion facing to a stator.
Figure 3:
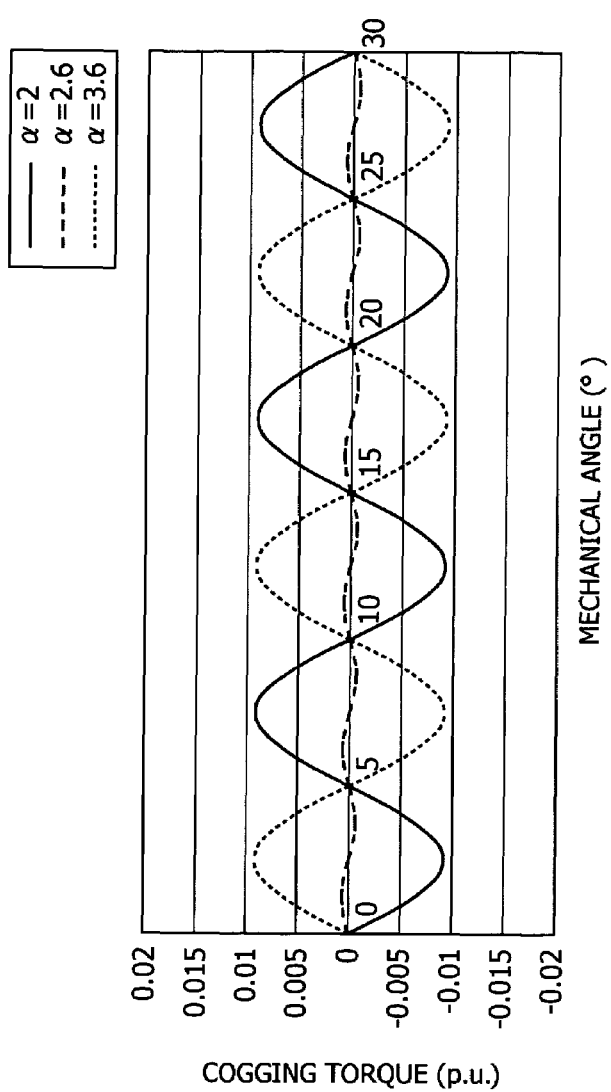
FIG. 3 is a characteristic diagram showing the relationship of characteristics of cogging torque to rotation angle of rotor.
Figure 3:
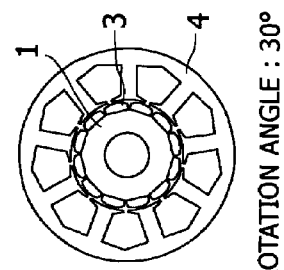
Figure 3:
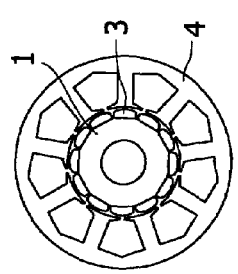
Figure 3:
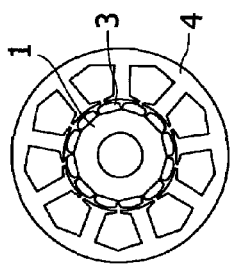

FIG. 1 is a schematic view showing a permanent magnet motor, FIG. 2 is a schematic view showing the radius of the outer peripheral surface of a rotor and the radius of curvature of a permanent magnet portion facing towards a stator, and FIG. 3 is a characteristic diagram showing the relationship of characteristics of cogging torque to rotation angle of rotor.

In FIG. 1, reference numeral 1 denotes a rotor supported on a rotating shaft 2. The rotor 1 is provided with twelve permanent magnets 3 arranged at fixed intervals along the circumferential direction at the peripheral edge thereof. The permanent magnets 3 each are formed with an arcuate surface 3a the outer peripheral surface of which has a fixed curvature along the circumferential direction. Reference numeral 4 denotes a stator disposed around the rotor 1 with a gap 5 being provided with resect to the rotor 1. The stator 4 is provided with nine magnetic poles 4a that are arranged at fixed intervals in the circumferential direction so as to face radially to the outer peripheral surface of the rotor 1. On each of the magnetic poles 4a, a stator coil, not shown, is wound to generate a rotating magnetic field for rotating the rotor 1. A stator iron core of the stator 4 is formed into a slot construction to wind the stator coil.

The permanent magnet 3 is mounted on a rotor iron core of the rotor 1 so as to face radially towards the tip end of the magnet pole 4a of the stator 4.

As shown in FIG. 2, taking the radius of an outer peripheral surface 1a of the rotor 1 as R1 and the radius of curvature of an arcuate surface 3a of the permanent magnet 3 facing towards the magnetic pole 4a of the stator 4 as R2, a parameter $\alpha$ is specified as ($\alpha$=R1/R2.

Since the value of the parameter $\alpha$ is obtained by dividing the radius of the outer peripheral surface 1a of the rotor 1 by the radius of curvature of the arcuate surface 3a of the permanent magnet 3 facing towards the magnetic pole 4a of the stator 4, the central portion of the permanent magnet 3 becomes thick as the value of the parameter $\alpha$ increases.

FIG. 3 shows the relationship of characteristics of cogging torque to rotation angle of rotor. The parameter has the value of $\alpha$ (=R1/R2).

FIG. 3 shows characteristic curves in the cases where $\alpha$ is 2, $\alpha$ is 2.6, and $\alpha$ is 3.6. The sectional views of motor under the graph illustrate states in which the rotation angle of the rotor 1 is 0° (reference point), 15°, and 30° in that order from the left-hand side.

FIG. 3 reveals that in the case where $\alpha$=2.6, the cogging torque is extremely low.

Figure 4:
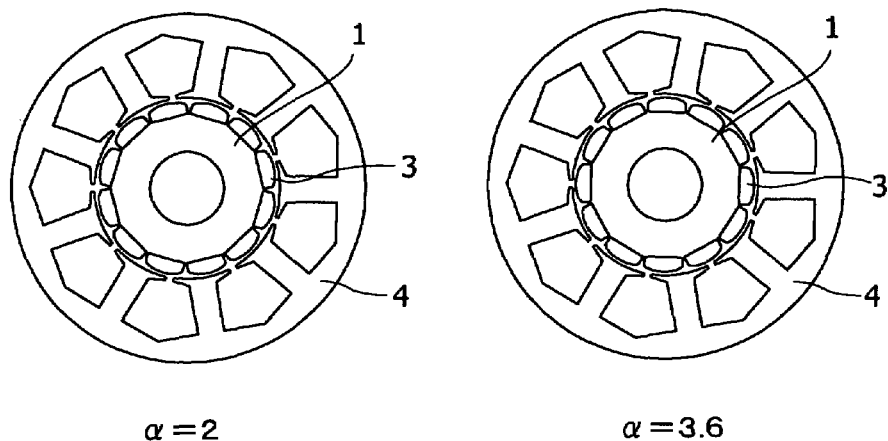
FIG. 4 is a view showing a magnetically stable point of a permanent magnet motor consisting of a rotor having twelve permanent magnets and a stator having nine magnetic poles.

FIG. 4 shows a magnetically stable point of a permanent magnet motor consisting of a rotor having twelve permanent magnets and a stator having nine magnetic poles. The left figure shows the case where $\alpha$=2, and the right figure shows the case where $\alpha$=3.6. As shown in FIG. 4, it can be confirmed that the magnetically stable points are different between the case where $\alpha$=2 and the case where $\alpha$=3.6. Thereby, the reason why the phase of cogging torque waveform changes in accordance with the value of $\alpha$ can be explained. In the case where $\alpha$=2, the reference point in FIG. 3 is the magnetically stable point. In contrast, in the case where $\alpha$=3.6, the time of 15° (central figure) provides the stable point.

Hereunder, the relationship between the graph of cogging torque and the magnetically stable point of the rotor 1 is explained briefly.

The magnetically stable point indicates a point where the value becomes zero in a portion of negative inclination (steady decline) of graph. At this point, when an external force is applied to the rotor 1, torque is generated so as to cancel the external force. Therefore, when the rotor 1 lies at this point, it always stays at this point unless an external force such as to get over the peak of graph is applied. Therefore, this point is called the stable point.

In the case where $\alpha$=2.6, it is found that the value of cogging torque decreases, and the period is also halved. This tendency appears in the case where $\alpha$=2.55 to 2.7.

To explain these phenomena, assuming that the linearity of magnetic circuit is kept, cogging torque in the case where one permanent magnet 3 is provided is considered.

Figure 5:
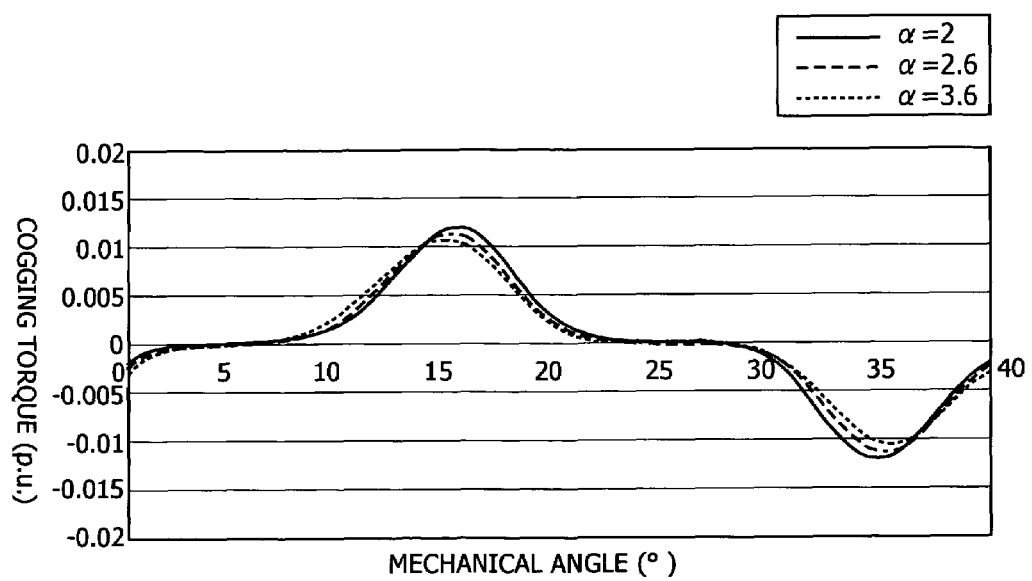
FIG. 5 is a waveform diagram showing cogging torque waveforms in the case where one permanent magnet is provided.

FIG. 5 shows cogging torque waveforms in the case where one permanent magnet is provided. As in FIG. 3, the cases where $\alpha$=2, $\alpha$=2.6, and $\alpha$=3.6 are shown in FIG. 5. Because of nine slots, the period of cogging torque is 40°.

Figure 6:
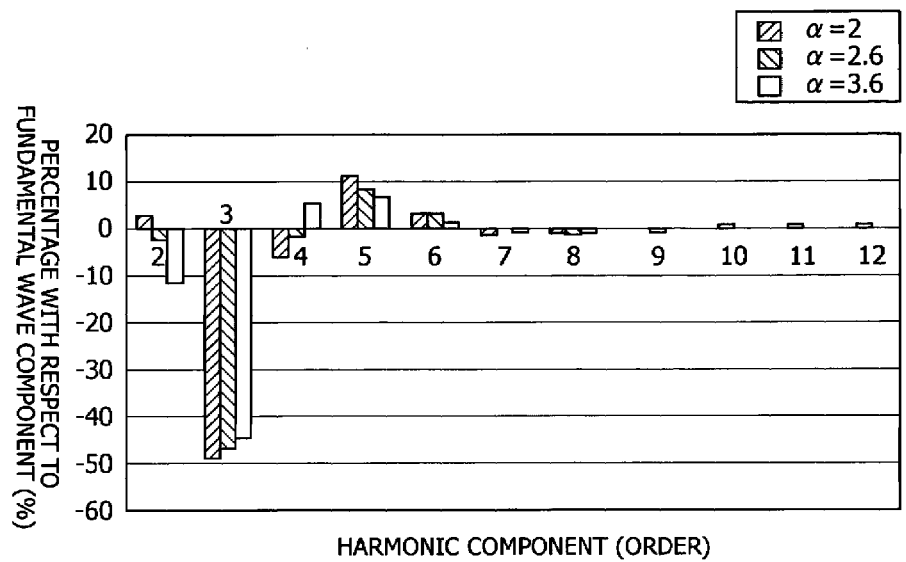
FIG. 6 is a graph showing a ratio with respect to a fundamental wave (percentage of wave value at the time when the value of fundamental wave is taken as 1), which is obtained by frequency analysis of the waveform shown in FIG. 5.

FIG. 6 shows a ratio with respect to a fundamental wave (percentage of wave value at the time when the value of fundamental wave is taken as 1), which is obtained by frequency analysis of the waveform shown in FIG. 5. In this figure, the period of fundamental wave is 40°, and many frequency components exist. Since the number of permanent magnets 3 is twelve, and each of them has a phase difference of 30°, the cogging torque of motor is torque in which cogging torque waveforms are lapped with the phase being shifted by 30°.

Figure 7:
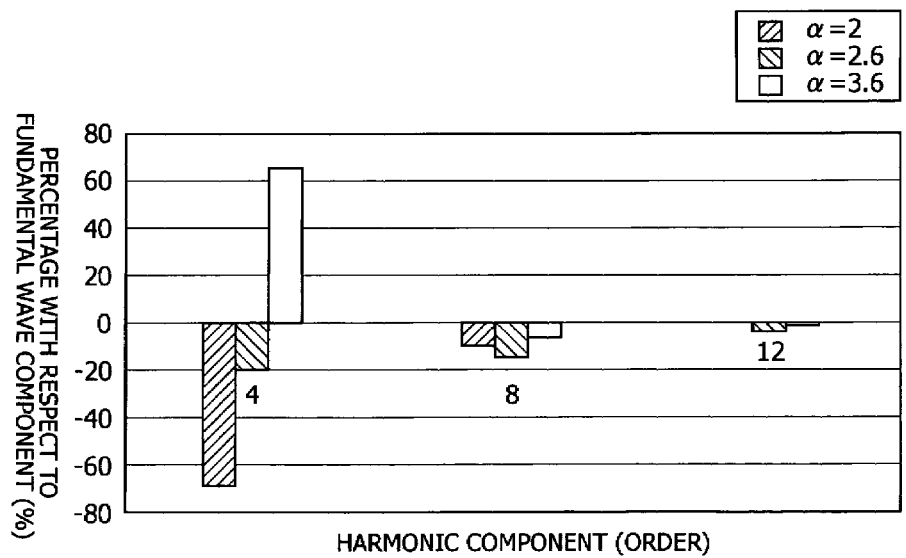
FIG. 7 is a graph in which only frequency components of multiples of four are extracted.
Figure 8:
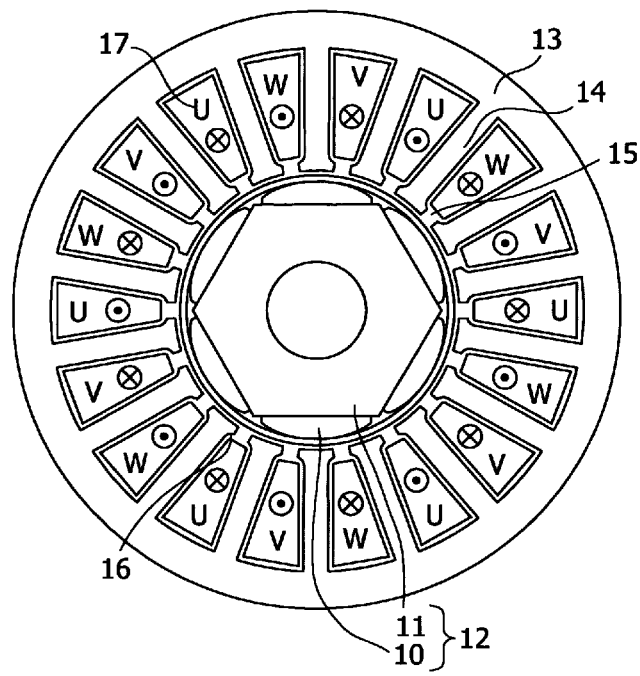
FIG. 8 is a sectional view of a permanent magnet motor relating to the related art.
Figure 9:
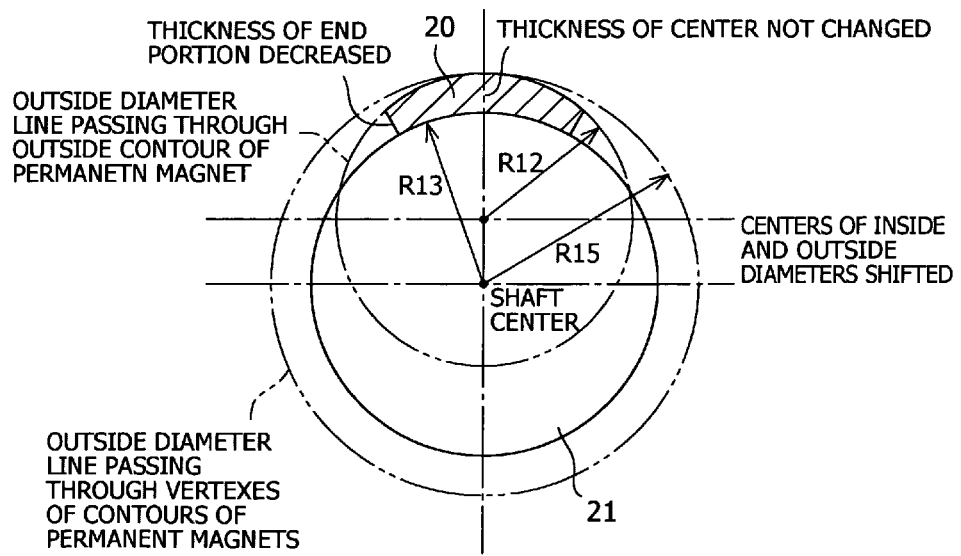
FIG. 9 is a diagram in which the center of the outside diameter of a permanent magnet is shifted to reduce cogging torque.

As a result, many frequency components are cancelled, and finally only harmonic components of multiples of four remain. FIG. 7 is a graph in which only frequency components of multiples of four are extracted. Comparing the case where $\alpha$=2 with the case where $\alpha$=3.6, the sign of fourth-order harmonic component is inverted. In other words, the phase is reversed. This phenomenon coincides with the characteristics shown in the graph of FIG. 3.

In the case of $\alpha$=2.6, which is in between the cases where $\alpha$=2 and $\alpha$=3.6, the fourth-order harmonic decreases. However, the eighth-order harmonic increases as compared with harmonics of other orders.

In summary, the following can be said from the graph of FIG. 7.

(1) In the cases where $\alpha$=2 and $\alpha$=3.6, for the cogging torque, the fourth-order harmonic component is prominently high, and other orders (eighth order, twelfth order) can be ignored.

(2) In the case of $\alpha$=2.6, the fourth-order harmonic component is low, and the eighth-order harmonic component is rather high. Therefore, in the case of $\alpha$=2.6, the cogging torque is formed by two components of fourth-order harmonic and eighth-order harmonic.

(3) In the case of $\alpha$=2.6, since the eighth-order harmonic component is effective, the period of cogging torque is a half of that in the case of only fourth-order harmonic component (in the cases where $\alpha$=2 and $\alpha$=3.6) (this coincides with the characteristics shown in FIG. 3).

As described above, according to the present invention, effects described below are achieved.

In a permanent magnet motor consisting of a rotor, which is supported on a rotating shaft and has twelve permanent magnets arranged at fixed intervals in the circumferential direction in the peripheral edge portion thereof, and a stator, which is disposed with a gap being provided with respect to the rotor and has nine magnetic poles, each having a coil wound thereon, arranged at fixed intervals in the circumferential direction so as to face to the outer peripheral surface of the rotor, a value obtained by dividing the radius of the rotor by the radius of curvature of a permanent magnet surface facing towards the stator is set at a value such as to decrease cogging torque. Thereby, the cogging torque can be decreased.

Also, the value obtained by dividing the radius of rotor by the radius of curvature of a permanent magnet surface facing towards a stator is set in the range of 2.55 to 2.7. Thereby, the cogging torque can further be decreased.

The invention claimed is:

1. A permanent magnet motor consisting of a rotor, which is supported on a rotating shaft and has twelve permanent magnets arranged at fixed intervals in the circumferential direction in the peripheral edge portion thereof, and a stator, which is disposed around the rotor with a gap being provided with respect to the rotor and has nine magnetic poles, each having a coil wound thereon, arranged at fixed intervals in the circumferential direction so as to face towards the outer peripheral surface of the rotor,
wherein a value obtained by dividing the radius of rotor by the radius of curvature of a permanent magnet surface facing towards a stator is set in the range of 2.55 to 2.7.

2. The permanent magnet motor according to claim 1, wherein the value obtained by dividing the radius of rotor by the radius of curvature of a permanent magnet surface facing towards a stator is set at 2.6.

* * * * *